US006956833B1

(12) United States Patent
Yukie et al.

(10) Patent No.: US 6,956,833 B1
(45) Date of Patent: Oct. 18, 2005

(54) METHOD, SYSTEM AND DEVICES FOR WIRELESS DATA STORAGE ON A SERVER AND DATA RETRIEVAL

(75) Inventors: Satoru Yukie, San Diego, CA (US); Gina C. Eubanks, San Diego, CA (US); Ken Aoki, Tenafly, NJ (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 09/542,126

(22) Filed: Apr. 4, 2000

Related U.S. Application Data

(60) Provisional application No. 60/181,129, filed on Feb. 8, 2000, provisional application No. 60/180,990, filed on Feb. 8, 2000, provisional application No. 60/180,987, filed on Feb. 8, 2000, provisional application No. 60/180,985, filed on Feb. 8, 2000, provisional application No. 60/181,148, filed on Feb. 8, 2000, provisional application No. 60/181,144, filed on Feb. 8, 2000, provisional application No. 60/181,145, filed on Feb. 8, 2000, provisional application No. 60/180,992, filed on Feb. 8, 2000, provisional application No. 60/180,991, filed on Feb. 8, 2000, provisional application No. 60/181,105, filed on Feb. 8, 2000, provisional application No. 60/181,128, filed on Feb. 8, 2000, provisional application No. 60/180,988, filed on Feb. 8, 2000, provisional application No. 60/181,147, filed on Feb. 8, 2000, provisional application No. 60/181,127, filed on Feb. 8, 2000, provisional application No. 60/180,984, filed on Feb. 8, 2000, provisional application No. 60/180,993, filed on Feb. 8, 2000, provisional application No. 60/191,184, filed on Mar. 22, 2000, and provisional application No. 60/192,264, filed on Mar. 27, 2000.

(51) Int. Cl.[7] ............................................. H04L 12/26
(52) U.S. Cl. .................... 370/328; 370/338; 370/352; 709/203
(58) Field of Search ................................ 370/328, 338, 370/352; 709/203

(56) References Cited

U.S. PATENT DOCUMENTS

| 5,128,755 | A | | 7/1992 | Fancher |
|---|---|---|---|---|
| 5,537,586 | A | * | 7/1996 | Amram et al. ................. 707/3 |
| 5,761,662 | A | * | 6/1998 | Dasan et al. .................. 707/10 |
| 5,848,064 | A | * | 12/1998 | Cowan ....................... 370/338 |
| 6,198,941 | B1 | * | 3/2001 | Aho et al. ................... 455/552 |
| 6,314,094 | B1 | * | 11/2001 | Boys ......................... 370/352 |
| 6,363,339 | B1 | * | 3/2002 | Rabipour .................... 704/201 |
| 6,389,337 | B1 | * | 5/2002 | Kolls ......................... 701/29 |
| 6,615,024 | B1 | * | 9/2003 | Boros et al. ............... 455/67.4 |
| 6,697,792 | B2 | * | 2/2004 | Bunney et al. ................ 707/1 |

FOREIGN PATENT DOCUMENTS

| WO | WO 97/41654 | 11/1997 |
|---|---|---|
| WO | WO 98/35469 | 8/1998 |
| WO | WO 99/56431 | * 11/1999 |

* cited by examiner

*Primary Examiner*—Kenneth Vanderpuye
(74) *Attorney, Agent, or Firm*—John P. O'Banion

(57) ABSTRACT

A method and system for remotely storing data on a server through a wireless connection instead of storing data locally in a consumer device, as well as devices for use with the method and system. More particularly, a video camera, still camera, laptop computer, or other consumer device which normally stores data in local memory such as film, disk, random access memory, memory sticks, or other forms of storage would transmit the data to a remote server through a wireless connection. The data would be saved on the remote server for subsequent retrieval through, for example, the Internet or a wireless connection to the server. In addition, data not originating from the user device could be downloaded to the consumer device. The data to be retrieved can be specified by the user, or sent to the user according to a user profile stored on the server.

77 Claims, 4 Drawing Sheets

METHOD, SYSTEM AND DEVICES FOR WIRELESS DATA STORAGE ON A SERVER AND DATA RETRIEVAL

CROSS-REFERENCE TO RELATED APPLICATIONS

This application claims priority from U.S. provisional application Ser. No. 60/181,129 filed on Feb. 8, 2000 entitled NETWORK REAL-TIME MONITORING, U.S. provisional application Ser. No. 60/180,990 filed on Feb. 8, 2000 entitled NETWORK PHONE CONTROL, U.S. provisional application Ser. No. 60/180,987 filed on Feb. 8, 2000 entitled NETWORK HOME SECURITY, U.S. Provisional application Ser. No. 60/180,985 filed on Feb. 8, 2000 entitled NETWORK INTERCOM, U.S. provisional application Ser. No. 60/181,148 filed on Feb. 8, 2000 entitled WIRELESS STORAGE ON SERVER, U.S. provisional application Ser. No. 60/181,144 filed on Feb. 8, 2000 entitled MUSIC PLAYER WITH WIRELESS STORAGE ON SERVER, U.S. provisional application Ser. No. 60/181,145 filed on Feb. 8, 2000 entitled CAMERA WITH WIRELESS STORAGE ON SERVER, U.S. provisional application Ser. No. 60/180,992 filed on Feb. 8, 2000 entitled VIDEO CAMERA WITH WIRELESS STORAGE ON SERVER, U.S. provisional application Ser. No. 60/180,991 filed on Feb. 8, 2000 entitled VIDEO DISPLAY WITH WIRELESS CONNECTION, U.S. provisional application Ser. No. 60/181,105 filed on Feb. 8, 2000 entitled CAR STEREO WITH WIRELESS STORAGE ON SERVER, U.S. provisional application Ser. No. 60/181,128 filed on Feb. 8, 2000 entitled TELEPHONIC DEVICE WITH WIRELESS NETWORK CONNECTION, U.S. provisional application Ser. No. 60/180,988 filed on Feb. 8, 2000 entitled HANDHELD CONTROL DEVICE WITH WIRELESS NETWORK CONNECTION, U.S. provisional application Ser. No. 60/181,147 filed on Feb. 8, 2000 entitled GAME DEVICE WITH WIRELESS CONNECTION, U.S. provisional application Ser. No. 60/181,127 filed on Feb. 8, 2000 entitled APPLIANCE WITH WIRELESS CONNECTION, U.S. provisional application Ser. No. 60/180,984 filed on Feb. 8, 2000 entitled COMPUTER SYSTEM WITH WIRELESS CONNECTION, U.S. provisional application Ser. No. 60/180,993 filed on Feb. 8, 2000 entitled PERSONAL INFORMATION ACCESS WITH WIRELESS CONNECTION, U.S. provisional application Ser. No. 60/191,184 filed on Mar. 22, 2000 entitled WIRELESS IP RECEIVER WITH USER PROFILE, and U.S. provisional application Ser. No. 60/192,264 filed on Mar. 27, 2000 entitled CONTENT SERVER, each of which is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright and maskwork rights has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

1. Field of the Invention

This invention pertains generally to data storage methods and devices, and more particularly to a method, system and devices that provide for remote storage and retrieval of data that would otherwise be provided locally.

2. Description of the Background Art

There is a wide range of user devices available on the market that rely on internal memory or insertion of external storage devices for operation. A well known example is a camcorder where local storage data storage media such tapes, disks, memory sticks, and the like are used to store images that are recorded by the camcorder. Since internal memory or external storage devices are not unlimited in capacity, the tapes, disks, etc. eventually need to be changed to continue recording images. This presents an element of inconvenience, particularly when storage capacity is reached at a critical time, an element of expense since it is generally necessary to purchase multiple storage devices for extended use of the camcorder, and an element of unreliability since the storage devices can fail. This holds true with any device that relies on data storage and uses a form of local data storage media.

BRIEF SUMMARY OF THE INVENTION

The present invention addresses the limitations associated with relying on local data storage media by employing a wireless communications link to a remote data server. By way of example, and not of limitation, a video camera, still camera, laptop computer, or other device which normally stores data in local memory such as film, disk, random access memory, memory sticks, or other forms of storage would transmit the data to a remote server through a wireless connection. The data would be saved on the remote server for subsequent retrieval through, for example, the Internet or a wireless connection to the server. In addition, the user can download data from the server that did not originate from the user such as, for example, commercially available audio files, video files, images, and the like. Data retrieval can be manual where the user specifies data to be downloaded, or can be automated through the use of a personal user profile stored on the server which defines what data will be downloaded, as well as how and when the data will be downloaded. Therefore, the invention not only provides an alternative to local data storage, but further enables the development of a myriad of consumer devices with wireless access to data.

An object of the invention is to reduce or eliminate the need for local data storage media in a consumer device.

Another object of the invention is to enable a consumer device to send data to a remote location for storage.

Another object of the invention is to provide a wireless data feed to a consumer device.

Another object of the invention is to provide the user of a wireless consumer device to specify data to be retrieved from a remote server.

Another object of the invention is to present data to a wireless consumer device based on a predetermined user profile.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

Figure 1:
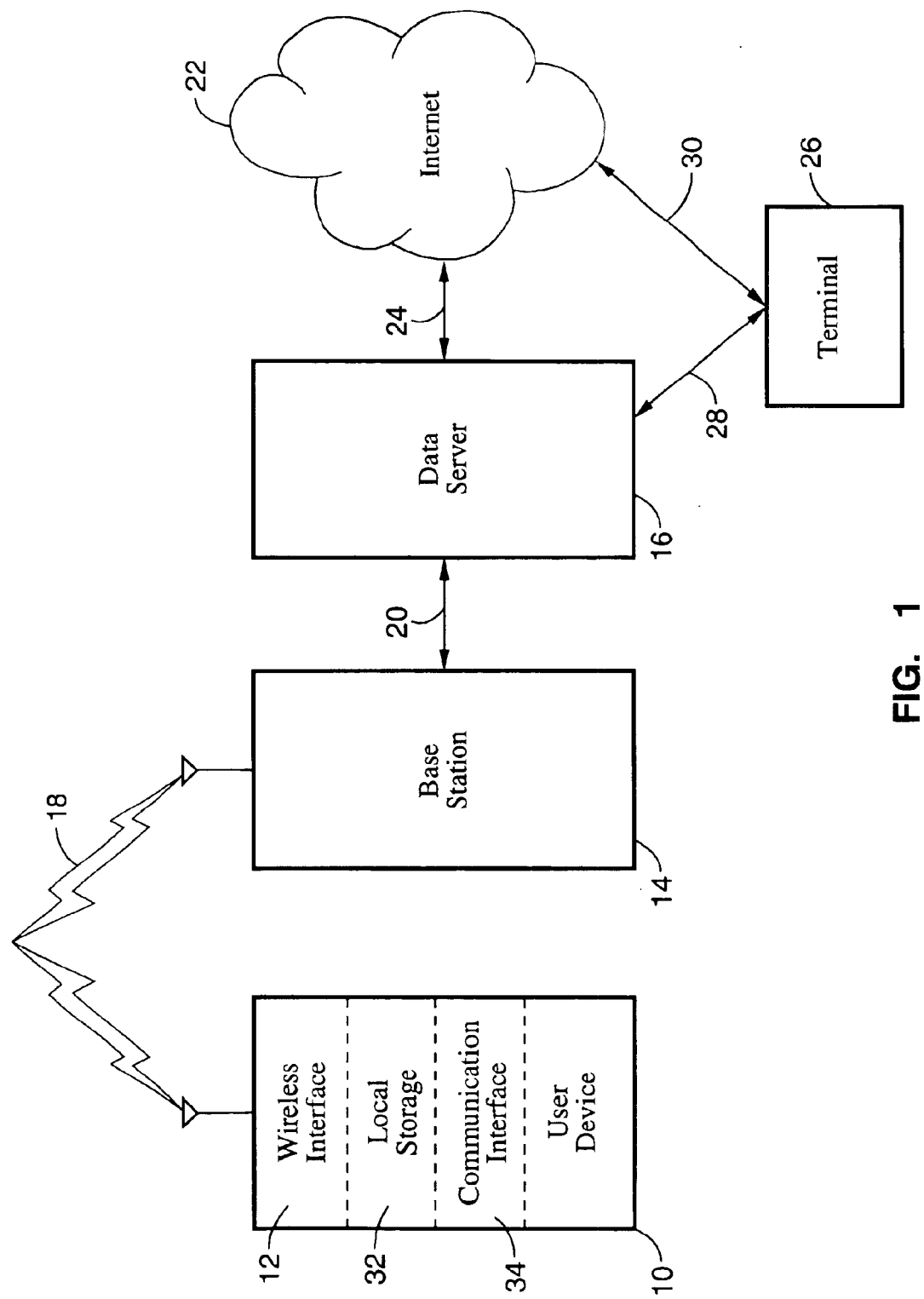
FIG. 1 is schematic diagram of a wireless data storage and retrieval system according to the present invention.

Referring to FIG. 1, a general embodiment of a system according to the present invention preferably comprises a user device 10 with a wireless interface 12, a base station 14, and a data server 16. User device 10 communicates with base station 14 over a wireless connection 18, and base station 14 communicates with data server 16 over a landline, wireless, or other communications link 20. Data server 16 is configured for permanent or part-time connection to the Internet 22 through a landline, wireless or other communications link 24, and can be accessed from a terminal 26, such as a personal computer or the like, either through a direct connection 28, through a network connection 30 to the Internet 22, or through an alternative communications link. User device 10 can comprise any number of devices, without restriction, such as a music player, a still camera, a video camera, a video display, a car stereo, a telephonic device, a handheld control device, a game device, an appliance, a computer system, a personal digital assistant, or any like device that would ordinarily include, or be connected to, local data storage media 32. Note in this regard that local data storage media 32 is optional, and that the present invention is directed to alternatives to using local data storage media 32. This can include using local data storage media 32 as primary storage and data server 16 as secondary storage, using data server 16 as primary storage and local data storage media 32 as secondary storage, or eliminating local data storage media 32 altogether.

Wireless interface 12 can be a receiver only, a transmitter only, or be a transceiver for bi-directional communications. Similarly, base station 14 can be a receiver only (if wireless interface 12 is a transmitter) or can include a transmitter as well for bi-directional communications. In the preferred embodiment, both wireless interface 12 and base station 14 are transceivers for bi-directional communications. The construction and operation of such communications devices, as well as the manner of interconnecting such communications devices to other devices such as user device 10 or data server 16 for data input and output, are well known in the art and will not be described herein.

Data server 16 can be a personal server of the user for storing a user's personal data files. The data server can be secure, such as by using encryption and/or password access, to protect the user's data. Alternatively, data server 16 can be a public server, such as a server accessible to multiple users for storage, or a commercial server where downloading data incurs a fee to the user through identification passed from user device 10 to data server 16. A user can be billed for the service in various ways or combinations of ways, including a monthly basis, a content basis (per song, per movie, etc.), a data access basis (e.g., an amount of money per megabit of data sent to the user), a service basis (e.g., the number and/or type of channels and/or monitoring services designated in the user profile), and a registration basis (e.g., the number and/or type of devices registered with the server, such as for customized download). The server can provide data to a user on a rental (limited use, such as a finite number of times) or purchase (unlimited use) basis. The server can include security or conditional access systems or software to control redistribution and access. The server or administrator can also bill a user for access independent of content (e.g., a monthly fee for all users).

According to one mode of operation, user device 10 establishes a wireless connection to data server 16 and sends data to data server 16 for storage and later access by user device 10. User device 10 can either access data server 16 through the wireless connection or through a wireline network connection, such as through dialup access to the Internet. If data server 16 is accessed through the wireless connection, user device 10 would include user controls (not shown) for entering data retrieval parameters for transmission to data server 16. If data server 16 is accessed through a wireline connection, user device 10 may include a suitable communications interface 34, such as a modem, for direct communication. Alternatively, communications interface 34 could be a universal serial bus (USB), serial, Firewire™ or other interface for connection to terminal 26, and terminal 26 would include suitable software for accessing data server 16.

As described above, several functional embodiments of local data storage media 32 are contemplated. In accordance with one embodiment, local data storage media 32 would be limited in size to an amount which allows operation of user device 10 and transmission of data to data server 16 for storage, but not substantially beyond that amount. In accordance with another embodiment, local data storage media 32 would comprise transient storage, such as random access memory (RAM). In this embodiment, when user device 10 stores data for long-term use (e.g., not data for immediate operation of the device, such as program instructions), user device 10 sends the data to data server 16 through the wireless connection. User device 10 determines what data is available on data server 16 by querying data server 16 across the wireless connection. According to still another embodiment, local data storage media 32 need only comprise sufficient local storage to store information indicating available data on data server 16. Therefore, it will be appreciated that local data storage media 32 can be embodied in various forms with various amounts of storage capability, including, for example, removable media such as a PCMCIA memory card, PCMCIA hard drive card, a floppy disk, a tape, the like. Some embodiments would be internal to user device 10, while other would be peripheral devices.

Wireless interface 12 can also comprise several embodiments both functionally, and constructively. For example, wireless interface 12 can be an embedded wireless modem or, alternatively, comprise a removable device such as a PCMCIA card wireless modem. Preferably, wireless interface 12 is self-contained so as to provide for efficient installation (e.g., simply inserting a card into an appropriate port) and operation for a user. Or, installation by the user could be avoided completely by using an embedded wireless interface. Wireless interface 12 can also be set to be active whenever user device 10 is active, allowing continuous wireless access, or be user selectable.

Note also that operation and control of user device 10, as well as associated peripheral devices, can comprise various forms and be implemented through software executed by hardware including memory and a processor. Alternatively, an all hardware implementation can be employed.

Those skilled in the art will appreciate that the wireless connection between user device 10 and base station 14 can be implemented in various ways. For example, it is contemplated that the connection could be through a readily available wireless internet protocol (IP) network, such as an iBurst™ or Ricochet™ connection. This type of connection provides an IP-packet switch and is a high speed broadband connection suitable for transmission of audio and video data. The high speed nature of the connection provides an advantageous data transfer rate for storage on data server 16. And, because the connection is wireless, user device 10 is readily portable or mobile. Furthermore, different wireless systems can also be used for the connection, such as an analog cellular system. Alternatively, the connection can use a different network protocol than IP, such as mobile IP, or other forms of packet-based protocols.

Figure 2:
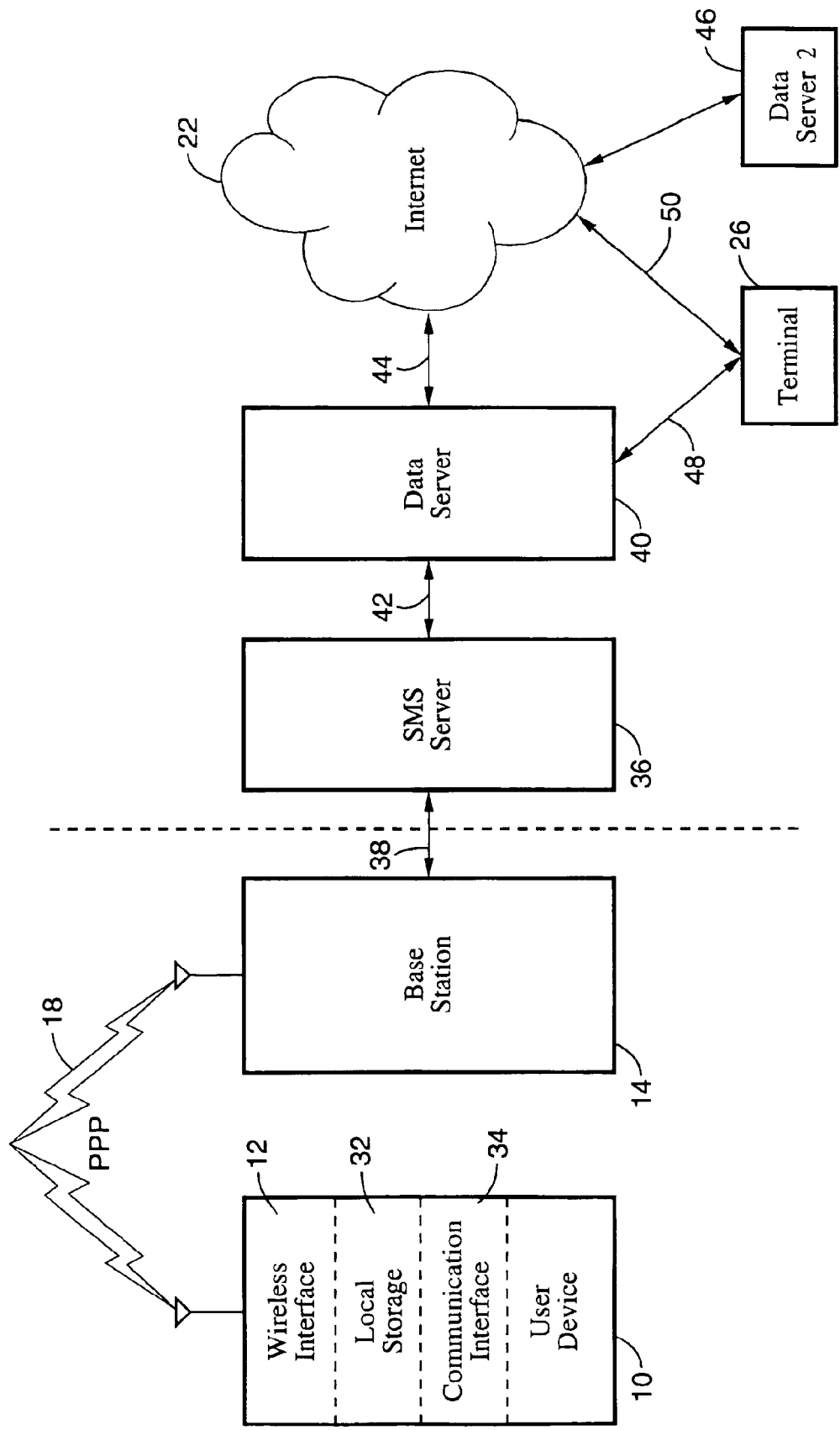
FIG. 2 is a schematic diagram of an alternative embodiment of the wireless data storage and retrieval system shown in FIG. 1.
Figure 3:
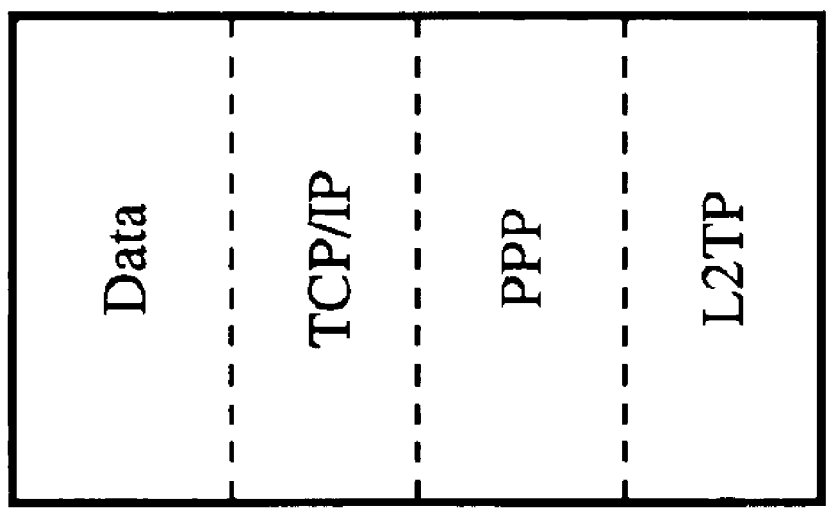
FIG. 3 is a diagram of a mobile IP data stack employed in the system shown in FIG. 2.

However, the preferred form of wireless communication is the iBurst™ technology available from ArrayComm where spatial division multiple access (SDMA) would be used to send a directional beam directly to user device 10. This technology is described in one or more of the following patents owned by ArrayComm which are incorporated herein by reference: U.S. Pat. Nos. 5,909,471; 5,828,658; 5,642,353; 5,625,880; 5,592,490; 5,546,090; 5,515,378; 6,037,898; 6,023,203; 5,973,678; 5,920,243; 5,909,470; and 5,886,988. FIG. 2 shows an example of how the system of FIG. 1 could be modified to employ SDMA IP-packet data transmission techniques in this context, and FIG. 3 shows the IP stack that would be used. Note that instead of base station 14 being connected to data server 16 as in FIG. 1, it is connected to an SMS server 36 through a communications link 38. SMS server 36 is in turn connected to a first data server 40 through a communications link 42, which is in turn connected to the Internet 22 through a communications link 44. A second data server is also shown connected to the Internet 22. Terminal 26 is shown configured for accessing first data server 40 directly through communications link 48 or through the Internet 22 via communications link 50. In this embodiment, TCP/IP packets originating from user device 10 will be encapsulated in PPP for wireless transmission. The packets will be received by base station 14 and routed to SMS server 36 where they will be encapsulated in L2TP/PPP. SMS server 36 will route the L2TP/PPP data to first data server 40 where the data will be stored or converted to TCP/IP for transmission over the Internet 22 to second data server 46. Data can later be retrieved from either first data server 40 or second data server 46.

In short, base station 14 would locate user device 10 and directionally transmit the signal to user device 10 for reliability. Also, once a connection between user device 10 and base station 14 is made, the connection can be maintained even though user device 10 may not be continuously sending data. Preferably, all data generated by user device 10 will be in IP format to allow for efficient transmission. The IP packets will be encapsulated in PPP prior to wireless transmission, and then converted back to IP format after receipt by base station 14.

With the foregoing in mind, it can be appreciated that the present invention provides for any user device to use a wireless feed instead of using tapes, memory sticks, etc. The wireless network is preferably bi-directional, and provides for remote storage of the information. The data would be transmitted in IP format so that it can be sent efficiently in packets over the wireless connection. The remote server would store the information for later retrieval. Therefore, it would no longer be necessary to incorporate local storage in a user device unless desired. The result is that the memory requirements of the user device are eliminated, which reduces power consumption as well as storage limitations.

User device 10 can take on many forms, some of which will be now described.

1. Music Player

In accordance with an aspect of the invention, user device 10 is a music player. The music player outputs audio by processing audio files for a user, such as playing music stored in an electronic file in an encoded format such as MP3. As described above, the music player would include a wireless interface 12 to interact with data server 16 across a wireless connection. To play an audio file, the music player would connect to data server 16 and query data server 16 about what audio files are available. The music player would then display the server's response to the user. In response to a selection by the user, the music player would request an audio file from data server 16 and data server 16 would send the file to the music player across the wireless connection. The music player receives the requested file from data server 16 and plays the file, such as by decoding the file and outputting corresponding audio through a speaker. The music player would download and play the received audio data immediately as an audio stream. Alternatively, or in addition, the music player can store the entire audio file, or a portion, and play the file immediately or at a later time. If desired, the music player can include sufficient storage for downloading multiple audio files, such as an entire album. The music player can also download supplementary information, such as artist information, interviews, images, etc.

Additionally, the music player can optionally include a microphone for audio recording. The input audio would be encoded and sent to data server 16 across the wireless connection. Alternatively, the music player could store the audio data locally and send the audio data to data server 16 at a later time, such as automatically at a preset time or condition (e.g., power down), or upon a command for remote storage by the user. The user can later access and play the stored audio from data server 16 as described above for the music player.

2. Still Image Camera

Another aspect of the invention contemplates that user device 10 is a still image camera. As described above, the camera would include a wireless interface 12 to interact with data server 16 across a wireless connection. The camera would record an image, using a CCD for example, as image data. When the user desires to store the image (e.g., by pressing a "shutter" button), the camera would send the image data across the wireless connection to data server 16 for storage as an image file. Alternatively, the camera can store the image locally and send the image to data server 16 at a later time, such as automatically at a preset time or condition (e.g., power down), or upon a command for remote storage by the user. The camera can encode the image data, such as into JPEG format, or data server 16 can encode the image data after receipt, or the image data can remain in the original format on data server 16.

If desired, the camera can include a visual display so that the user can view an image on the display. In this way, the user can view an image which has just been stored, or view the image before the image is stored (e.g. as the image is recorded by the camera but before the image has been selected for storage by the user). The user can also view an image which has been stored on data server 16. To view on the camera an image file stored on data server 16, the camera would connect to data server 16 and query what image files are available. The camera would then display the server's response to the user. In response to a selection by the user, the camera would request an image file from data server 16 and the server would send the file to the camera across the wireless connection. The camera would receive the requested file from data server 16 and display the image stored in the file, such as by decoding the file and displaying the image on the display. It will be appreciated that an advantage of storing images on data server 16 is that the user does not need to worry about the physical location of film or local removable media for storing images. Data server 16 is a known, stable, and easily accessible location for advantageous retrieval.

If desired, the camera would optionally include local data storage media 32 with sufficient storage for downloading multiple image files from data server 16. The camera could also download supplementary information, such as artist or image information. It is also contemplated that the camera could include an audio input and output for storing and outputting audio, such as for voice comments on images. The audio data could be stored and accessed in a similar manner to the image data, as described above.

3. Video Camera

The invention also contemplates that user device 10 could be a video camera. As described above, the camera would include a wireless interface 12 to interact with data server 16 across a wireless connection. The camera would typically record a video image stream, such as by using a CCD, as image data. When the user desires to begin storing the image stream (e.g., by pressing a "record" button), the camera would send the image data across the wireless connection to data server 16 for storage as an image file. The camera would continue to send recorded image data to data server 16 until the user desires to cease storing (e.g., by pressing a "stop" button). Alternatively, the camera could store the image stream locally on local data storage media 32 and send the image to data server 16 at a later time, such as automatically at a preset time or condition (e.g., power down or every 60 seconds), or upon a command for remote storage by the user. The camera can encode the image data, such as into MPEG or MPEG2 format, data server 16 can encode the image data, or the image data can remain in the original format on the server.

The camera could optionally include a display so that the user can view an image or image stream on the display. Alternatively, the camera could supply image data to a connected device, such as a television, for display. The user would then be able to view an image stream which has just been stored, or even before the image stream is stored (e.g., as the image is recorded by the camera but before the image has been selected for storage by the user). The user could also view an image or image stream which has been stored on data server 16 in an image file. To view on the camera an image file stored on the server, the camera would connect to data server 16 and query what image files are available. The camera would then display the server's response to the user. In response to a selection by the user, the camera would request an image file from the server and the server would send the file to the camera across the wireless connection. The camera would receive the requested file from the server and display the image stream stored in the file, such as by decoding the file and displaying the image on the display. The user could also request a still image from an image file, such as for preview. In that case, data server 16 server would also provide the still image by accessing the image file, obtaining an image from the image file, and sending the still image to the camera for display in a similar manner to that described above. Again, an advantage of storing images on data server 16 is that the user does not need to worry about the physical location of film or local removable media for storing images, and data server 16 is a known, stable, and easily accessible location for advantageous retrieval.

According to a further aspect of the invention, the camera would include local data storage media 32 with sufficient storage for downloading multiple image files. The camera could also download supplementary information, such as artist or image information. It is also contemplated that the camera could include an audio input and output for storing and outputting audio, such as for voice comments on images. The audio data could be stored and accessed in a similar manner to the image data, as described above.

4. Video Display

Another embodiment of user device 16 is a video display device, such as for watching movies or television, or viewing one or more still images. In a preferred embodiment, video display device includes software for accessing content on the Internet, such as web-browsing software. Data is transferred to and from the video display device across the wireless connection and displayed on a video display. The video display device can include or be connected to one or more input devices, such as a mouse and keyboard, to facilitate accessing Internet content. When the wireless connection is always active, the video display device has continuous access to the Internet. The wireless connection can automatically begin when the video display device is turned on, and so the user does not need to directly request Internet access.

For example, the video display device can be configured to download video data from a network server across a wireless connection using the wireless connection. To view video stored on the server, the video display device connects to data server 16 and queries what video image files are available. The video display device then displays the server's response to a user. In response to a selection by the user, the video display device requests a video image file from data server 16 and data server 16 sends the file to the video display device across the wireless connection. The video display device then receives the requested file from data server 16 and displays the image stream stored in the file, such as by decoding the file and displaying the image on the display. The video display device could also be configured to permit the user to request a still image from an image file, such as for preview. Data server 16 would provide the still image by accessing the image file, obtaining an image from the image file, and sending the still image to the video display device for display in a similar manner to that described above. Still images, such as art or family pictures, can also be requested for still viewing. The video display device could also be configured to access audio files from a server in a similar fashion.

Optionally the video display device could include local data storage media 32 with sufficient storage for downloading multiple image files. The video display device could also download supplementary information, such as artist or image information. When used with a video display device, the wireless connection can be configured to facilitate access to restricted content, such as in a pay per view (PPV) system over IP.

According to a still further aspect of the invention, the video display device would use data server 16 to store received broadcast or other video signals, such as for time shifting. As the video display device receives the video signal, it would encode the signal into a digital stream or file. The video display device would sends the digital video data to data server 16 for storage and later access. In this embodiment, the video display device would preferably include software and controls for controlling the storage function, such as "record" and "stop" buttons. This storage would provide the video display device with the functionality of a VCR or AVHDD device (audio visual hard disk drive device) without the local storage requirements.

Furthermore, the video display device can include audio input, such as a microphone, for storing and/or transmitting audio. The audio data can be stored locally on local data storage media 32 or on data server 16 across the wireless connection. Accordingly, the audio input and wireless connection can be used for voice communication across the wireless connection and the Internet, such as a voice over IP system. Additional telephony software can be included in the video display device or implemented in a peripheral device connected to the video display device (also possibly wirelessly) for managing the voice connection. The video display device can combine the audio communication with video display providing a one-way video phone over IP system. To provide two-way video phone functionality, the video display device also can include or be connected to a video camera.

In a preferred embodiment, the video display device is a portable device, such as a battery operated portable television, a handheld television, or a handheld video player (e.g., a display device similar to a television but which does not receive broadcast video such as NTSC, although the device need not be limited to an easily held form. The portable device would be configured to access data server 16 across the wireless connection to download video data. The portable video display device would download and display the video data as a video stream, without storing more data than necessary to decode and display the video. Accordingly, the memory requirements for the portable device can be low.

5. Car Stereo

User device 10 can also be a car stereo and associated connected equipment (e.g., speakers). The car stereo can include components for receiving radio broadcast, such as FM broadcast, and for playing audio stored on removable media, such as tapes and CDs. As described above, the car stereo would include a wireless interface 12 to interact with data server 16 across a wireless connection. The car stereo would output audio from electronic audio files by processing audio files for a user, such as playing music stored in an electronic file in an encoding scheme such as MP3. To play an audio file stored on data server 16, the car stereo would connect to data server 16 and query what audio files are available. The car stereo would display the server's response to the user. Alternatively, the car stereo can output audio indicating the server's response.

In response to a selection by the user, the car stereo requests an audio file from the server and the server sends the file to the car stereo across the wireless connection. The car stereo receives the requested file from the server and plays the file, such as by decoding the file and outputting corresponding audio through a speaker. The car stereo downloads and plays the received audio data in real-time, as an audio stream. Alternatively, or in addition, the car stereo can store the entire audio file in local data storage media 32, or a portion, and play the file immediately or at a later time.

In one implementation of the device, the car stereo can include local storage medial 22 with sufficient storage for downloading multiple audio files, such as an entire album. The car stereo can also be configured to download supplementary information, such as artist information, interviews, images, etc.

In another embodiment of the car stereo, the device can include a microphone for audio recording. The input audio is encoded and sent to data server 16 across the wireless connection. Alternatively, the car stereo can store the audio data locally in data storage media 32 and send the audio data to the server at a later time, such as automatically at a preset time or condition (e.g., power down), or upon a command for remote storage by the user. The user can later access and play the stored audio from data server 16 as described above for the car stereo. In addition, the audio input and wireless connection can be used for voice communication across the wireless connection and the Internet, such as a voice over IP system.

According to a still further embodiment, the wireless connection can be used to provide navigational information, such as from a source on the Internet. For example, when the car stereo includes or is connected to a display, maps can be downloaded and displayed for driving assistance. Additional useful automotive information can also be downloaded, such as technical assistance for mechanical problems. In addition, the car stereo can include a connection to the vehicles control system for accessing the vehicle's computer and stored software. Software can then be provided across the Internet to the vehicle to update the vehicle's operating software. Similarly, information can be provided by the vehicle's computer to a remote site, such as a car repair shop, for diagnostic purposes.

6. Telephonic Device

User device 10 can also be a telephonic communication device such as a telephone, cellular phone, telephonically enabled personal digital assistant (PDA), or fax machine. The telephonic device would include conventional components for receiving voice communication, such as over the PSTN or over a cellular voice system. The telephonic device would also include wireless interface 12, or be compatible with a wireless connection component for wirelessly accessing a network, such as the Internet.

The telephonic device can include software for accessing content on the Internet, such as web-browsing software. Data would be transferred to and from the telephonic device across the wireless connection and displayed on a display of the telephonic device. The telephonic device can include, or be connected to, one or more input devices, such as a mouse and keyboard, to facilitate accessing Internet content. When the wireless connection is always active, the telephonic device would have continuous access to the Internet across the wireless connection provided by wireless interface 12 or other wireless connection component. The wireless connection can automatically begin when the telephonic device is turned on, and so the user does not need to directly request Internet access.

The telephonic device can also include local storage media 32 for storing data, such as directories, documents, or data downloaded from the Internet. Alternatively, the telephonic device can include minimal storage, not substantially more than needed to provide for efficient operation and transfers across the wireless connection. With minimal local storage, the telephonic device would use data server 16 across the wireless connection for data storage. The data stored on data server 16 can be accessed on demand by the telephonic device through requests to data server 16.

User device 10 can also comprise a fax machine that would use the wireless connection to data server 16 for document storage or for information access. For example, a user can locate a desired fax number through a directory accessed through the Internet. In another embodiment, a user can store files to send or received files on data server 16.

If desired, any of the embodiments of the telephonic device, including the fax machine, could include audio input and output components, available for telephony functions for audio recording and playback. The device can store audio as audio data in electronic files. The audio data can be stored locally in local storage media 32, or on data server 16 across the wireless connection, as described above. For playback, the device would download audio data in an audio stream from data server 16 and outputs the audio in real-time. In addition, the audio input and wireless connection can be used for voice communication across the wireless connection and the Internet, such as a voice over IP system. Additional telephony software can be included in the device for managing the network voice connection. If provided with a display and camera, connected or embedded, the device can combine the audio communication with video display providing a video phone over IP system.

7. Handheld Control Device

A further embodiment of user device 10 is in the form of a handheld control device, such as a PDA or remote control. The control device can include an infrared transmitter for control of one or more remote devices. The control device would include a wireless interface 12 or otherwise be compatible with a wireless connection component for wirelessly accessing a network, such as the Internet.

The control device can include software for accessing content on the Internet, such as web-browsing software. Data would be transferred to and from the control device across the wireless connection and displayed on a display of the control device. The control device can include or be connected to one or more input devices, such as a mouse and keyboard, to facilitate accessing Internet content. When the wireless connection is always active, the control device would have continuous access to the Internet across the wireless connection provided by wireless interface 12. The wireless connection can automatically begin when the control device is turned on, and so the user does not need to directly request Internet access.

The control device can include local storage media 22 for storing data, such as documents or data downloaded from the Internet. Alternatively, the control device can include minimal storage, not substantially more than needed to provide for efficient operation and transfers across the wireless connection. With minimal local storage, the control device would rely on data server 16 across the wireless connection for data storage. The data stored on data server 16 can be accessed on demand by the control device through requests to the server.

In one functional embodiment, the control device comprises a remote control for establishing a connection to another associated device, such as a television or stereo, through a wireless link, such as an infrared link or a Bluetooth connection. As described above, the control device includes a wireless interface 12 to interact with data server 16 across a wireless connection. The control device can use this connection to access information available on the server, such as Internet accessible content. The control device can then transfer downloaded information to one of the associated devices, such as the television. For example, the control device can download program information from the Internet and supply the information to the television for enhanced television viewing, such as using the time a program will be broadcast for automatic tuning or recording. In another example, the control device can download current time information and set timers or clocks in associated devices. Another example would be for the control device to download user settings, such as a code for other data indicative of favorite channels, for television or VCR control.

According to another embodiment, the control device can operate as a remote control for other devices which have similar wireless interfaces and send commands to the other devices across the Internet or to a central server which then issues commands to the associated devices. By using the wireless connection for remote control, the remote control device has effectively unlimited range and can be used from any point in the network to control various devices in various locations, such as controlling the lighting and climate control systems in a home and in an office while using the device at a third location.

8. Game Device

User device 10 can also take the form of a wireless game device, such as a handheld game platform or a game console connected to a display device. The game device can include components for displaying video, such as bitmap graphics, and outputting audio. The game device can include a display or can be connected to an external display device, such as a television. The device can further include components for accessing removable storage media, such as a card, CDROM, or DVDROM, and executing software stored thereon, such as game or entertainment software. The game device would also include a wireless interface 12 or be compatible with a wireless connection component for wirelessly accessing a network, such as the Internet.

The game device can include software for accessing content on the Internet, such as web-browsing software. Data would be transferred to and from the game device across the wireless connection and displayed on an associated display device. The game device can include or be connected to one or more input devices, such as a mouse and keyboard, to facilitate accessing Internet content. When the wireless connection is always active, the game device has continuous access to the Internet. The wireless connection can automatically begin when the game device is turned on, and so the user does not need to directly request Internet access.

The game device would be configured to download data from data server 12 across the wireless connection. The data can include software or software updates, or data for transactions or services across the wireless connection, such as for online gaming. To view data and services provided by data server 12, the game device connects to data server 12 and queries what files or services are available. The game device then displays the server's response to a user. In response to a selection by the user, the game device requests a file or service from data server 12 and data server 12 sends data to the game device across the wireless connection to the support the request.

The game device can include local data storage media 32 with sufficient storage for downloading and storing data from multiple sessions. The game device can also download supplementary information, such as game or entertainment news or art.

With the game device, the wireless connection can also be configured to facilitate access to restricted content, similar to a pay per view (PPV) system over IP ("pay per play" or subscription based). Identification would be provided by the game device, such as automatically or through user input. In a "pay per play" system, a user is charged a fee for playing a game once (or some other number of times) or based on time played. The game software would be stored on data server 16 and accessed across the wireless connection, as described above. Local data storage media 32 or the like would be used for operating the game device and can be used for additional storage of user specific information. User specific information can also be stored on and accessed from data server 16. Alternatively, game software can be provided locally, through local storage or removable media, and supplementary software, data, or access codes are provided by the server for a fee. For example, a user can buy or rent a CDROM including game software, but to play the game the user must connect to data server 16 for an access code or other necessary data and for billing. The game device and data server 16 can also utilize a copy protection system for software security.

Additionally, the game device can include an audio input device, such as a microphone, for storing and/or transmitting audio, or an input port for connection to such a device. The audio data can be stored locally in data storage media 32 or on data server 16 across the wireless connection. Accordingly, the audio input and wireless connection can be used for voice communication across the wireless connection and the Internet, such as a voice over IP system. Additional telephony software can be included in the game device or implemented in a peripheral device connected to the game device (also possibly wirelessly) for managing the voice connection. The game device can further combine the audio communication with video display providing a one-way video phone over IP system. To provide two-way video phone functionality, the game device also can include or be connected to a video camera. The game device can also use the transmitted audio and/or video for enhanced online gameplay, such as chatting with other players.

An embodiment of the game device can be in the form of a portable device, such as a battery operated handheld device. The portable device can access data server 16 across the wireless connection to download data. The portable device can then download and display video data as a video stream, without storing more data than necessary to decode and display the video. Accordingly, the memory requirements for the portable device can be low.

9. Appliance Device

Still further, user device 10 can be in the form of a home appliance device, such as a refrigeration or washing machine. The appliance device can include components for displaying video, such as bitmap graphics, and outputting audio, as well as components for inputting audio and video. The appliance device can include a display or can be connected to an external display device, such as a television. The appliance device can include components for accessing removable storage media, such as a card, CDROM, or DVDROM, and executing software stored thereon, such as game or entertainment software. The appliance device also includes or is compatible with a wireless interface 12 for wirelessly accessing a network, such as the Internet.

The appliance device can include software for accessing content on the Internet, such as web-browsing software. For example, a user can access and order food from an online grocery store through the user's refrigerator. Data would be transferred to and from the appliance device across the wireless connection and displayed on an associated display device. The appliance device can include or be connected to one or more input devices, such as a mouse and keyboard, to facilitate accessing Internet content. When the wireless connection is always active, the appliance device would have continuous access to the Internet. The wireless connection can automatically begin when the appliance device is turned on, and so the user does not need to directly request Internet access. A constant wireless connection can also provide a user with remote access to the appliance device. For example, a user can send a query to the user's refrigerator to determine available food or to a climate control system to adjust temperature before the user arrives.

In an embodiment of the appliance device, the device would accesses data from data server 16 across the wireless connection using wireless interface 12. The data can include software or software updates, or data for transactions or services across the wireless connection. To view data and services provided by data server 16, the appliance device would connect to data server 16 and query what files or services are available. The appliance device would then display the server's response to a user. In response to a selection by the user, the appliance device would request a file or service from data server 16 and data server 16 would send data to the appliance device across the wireless connection to the support the request. The appliance device can also store data on data server 16 to reduce local storage requirements and provide remote access to that data.

The appliance device can include local data storage media 32 with sufficient storage for downloading and storing data from multiple sessions. The appliance device can also be configured to download supplementary information, such as recipes, washing instructions or tips, repair information, warranty information, or related products. Also, the appliance device can be configured to manually or automatically notify the manufacturer or a repair facility of the need for repair.

The appliance device can also include an audio input device, such as a microphone, for storing and/or transmitting audio or a port for connection of such a device. The audio data can be stored locally on local data storage media 32 or on data server 16 across the wireless connection. Accordingly, the audio input and wireless connection can be used for voice communication across the wireless connection and the Internet, such as a voice over IP system. Additional telephony software can be included in the appliance device or implemented in a peripheral device connected to the device (also possibly wirelessly) for managing the voice connection. The appliance device can combine the audio communication with video display providing a one-way video phone over IP system. To provide two-way video phone functionality, the appliance device also can include or be connected to a video camera.

10. Computer System

Additionally, user device 10 can be in the form of a computer system, such as a desktop personal computer system. The computer system can include components for displaying video, such as computer monitor, and outputting audio. The computer system can also include components for accessing local storage, such as a hard disk drive, and removable storage media, such as a disk, card, CDROM, or DVDROM, and executing software stored thereon. Furthermore, the computer system also includes or is compatible with a wireless interface for wirelessly accessing a network, such as the Internet. The computer system can include software for accessing content on the Internet, such as web-browsing software. Data would be transferred to and from the computer system across the wireless connection and displayed on an associated display device. The computer system can include or be connected to one or more input devices, such as a mouse and keyboard, to facilitate accessing Internet content. When the wireless connection is always active, the computer system will have continuous access to the Internet. The wireless connection can automatically begin when the computer system is turned on, and so the user does not need to directly request Internet access.

In an embodiment of the computer system, data would be downloaded from data server 16 across the wireless connection using wireless interface 12. The data can include software or software updates, or data for transactions or services across the wireless connection, such as for online gaming or banking. To view data and services provided by data server 16, the computer system would connect to data server 16 and query what files or services are available. The computer system would then display the servers response to a user. In response to a selection by the user, the computer system would request a file or service from data server 16 server and data server 16 would sends data to the computer system across the wireless connection to the support the request. For example, a user can store some or all the user's data on data server 16, using data server 16 as supplemental or primary storage. In one embodiment, the computer system does not include writable long-term storage, such as a hard disk drive, and stores all data to be preserved on data server 16 across the wireless connection. In another embodiment, the computer system includes sufficient storage for downloading and storing data from multiple sessions.

The computer system can store data on data server 16 for data archiving and backup purposes. The computer system can backup local storage media 32 on a regular basis automatically, such as daily or weekly, and/or upon request by the user. A network accessible server for backup can also provide access to the backup data from one or more other network access points, such as additional computer systems. If the wireless interface 12 is removable, the user can access the data on the server from any compatible system by inserting wireless interface 12 into the other system.

The computer system can also include an audio input device, such as a microphone, for storing and/or transmitting audio or a port for connecting such a device. The audio data can be stored locally on local data storage media 32 or on data server 16 across the wireless connection. Accordingly, the audio input and wireless connection can be used for voice communication across the wireless connection and the Internet, such as a voice over IP system. Additional telephony software can be included in the computer system or implemented in a peripheral device connected to the computer system (also possibly wirelessly) for managing the voice connection. The computer system can combine the audio communication with video display providing a one-way video phone over IP system. To provide two-way video phone functionality, the computer system also can include or be connected to a video camera.

11. Personal Information Access

It will be appreciated that the invention can be used for accessing personal information stored on data server 16 across the wireless network from any of the foregoing user devices, or from any other compatible wireless user device. Here, a user provides personal information to data server 16 and data server 16 can provide that information to the user or others upon later request. Various personal information can be stored on data server 16, such as personal identification information, medical information, or financial information. In one embodiment, data server 16 would store data or images representing physical cards ordinarily carried by the user, such as a drivers license or credit card. The information stored on data server 16 can be provided by the server, subject to user authorization, to other systems or device, such as a store, school, employer, or medical provider. As indicated above, data server 16 can be accessed by a device or system including or compatible with wireless interface 12 wirelessly accessing a network, such as the Internet.

Accordingly, in one embodiment the user provides information to data server 16 through a computer system, such as a personal computer. The user can store identification data, such as a drivers license number, and images of physical documents, such as the user's actual drivers license. The user can also store images or data to physically identity the user, such as an image of the user's face, or fingerprint identification data, or data from the government or a third person. This information can be made accessible to others, without or preferably with, appropriate access controls and security. In another embodiment, data server 16 provides documents which do not have physical equivalents, according to government or private requirements. The user can establish authorization criteria or rules for how the server provides the user's information to others, such as only when the user confirms a request or only when the request is from the user, or that some information can be freely provided to specified clients.

To request data from data server 16, a device or system connected to the server, such as through a wireless connection as described above or across the Internet, queries what data is available or whether specific data is available. The computer system displays the server's response to a requesting party, such as the user or a merchant. In response to a selection by the requesting party, the computer system requests data from data server 16 and data server 16 sends data to the computer system to the support the request.

For example, a user can store identification information on data server 16, such as by using a personal computer including wireless interface 12. When the user wants to complete a purchase transaction at a store, the user can provide that identification information to the store by requesting the information from data server 12. The user can place the request and provide the information to the store using a portable device carried by the user. Alternatively, the user can provide an access code to allow the store to access the information on data server 12 through the store's equipment. In another example, the access code provided by the user is fingerprint information scanned by a device of the store and the response provided by the server to the store confirms the identity and available credit of the user. In still another example, the access code is provided by a removable card, which can also include wireless interface 12, carried by the user and supplied to the store for insertion into store equipment.

In another embodiment, data server 16 is a network-accessible computer system, including local storage and wireless connection components or connections to switches for wireless connections. The operation and control of the computer system and wireless connection is effected through software executed by hardware including memory and a processor. Alternatively, an all hardware solution can be employed.

As can be seen, therefore, user device 10 can take the form of a number of embodiments. While several examples have been described, the user devices are unlimited in scope. Essentially, any device which receives, transmits, or otherwise utilizes data in one form or another, can be utilized as a wireless device in the system of the invention. Note also that the wireless user devices tend to fall into several categories, which include devices for sending data, devices for receiving data, and devices for both sending and receiving data.

Where user device 10 is configured for receiving (e.g., retrieving or otherwise accessing) data from data server 16, a user profile can be stored on data server 16 to define what data to provide and how and when to provide the data to the user. For example, if user device 10 is an audio device for playing digitally encoded music, such as a music player, a user profile on data server 16 would define what data to provide and how to provide that data to a corresponding user. To access data on data server 16, the user device would establish a wireless connection to data server 16. The connection can be one-way (e.g., data is transmitted from the server to the device only) or two-way. If the connection is two-way, user device 10 can send data to data server 16 for storage and later access by the device.

As described above, various embodiments of user device 10 can include local storage which is limited in size to an amount which allows operation of the device and transmission of data to data server 16 for storage, but not substantially beyond that amount. For example, local data storage media 32 would comprise only transient storage, such as RAM. Accordingly, when user device 10 stores data for long-term use (e.g., data which is not for immediate operation of the device), user device 10 sends the data to data server 16 through the wireless connection.

Also as described above, user device 10 can determine what data is available on data server 16 by querying data server 16 across the wireless connection. Preferably user device 10 includes sufficient local storage to store information indicating available data on data server 16. Alternatively, data server 16 can automatically send such information to user device 10. In either case, to access data on data server 16 that was stored on data server 16 by user device 10 itself or stored on data server 16 from some other source, the user would preferably store a user profile on data server 16. If the wireless connection is one-way, the user would store the user profile through a different connection, such as across the Internet using a desktop computer such as terminal 26. If the connection is two-way, the user can enter a user profile into user device 10 and transmit that user profile to data server 16. Data server 16 then transmits data to user device 10 according to the user profile. Alternatively, user device 10 could send a request to data server 16 for specific data and then receive the data sent from data server 16. The received data may include some or all of the data previously sent by user device 10 for storage on data server 16 or may include data derived from the stored data, such as file size or storage date.

Preferably, the user profile indicates what type of data is to be transmitted by data server 16 and at what time. This can be done by employing one or more "channels" of data which can be presented to user device 10 according to the user profile. For example, channels can be indicated or labeled by number and/or user defined labels, such as "jogging," "sleeping," "relaxation," etc. In other words, a channel would specify one or more types of data. As discussed below, various data sources can be designated as channels, including prerecorded content (e.g., a song or movie), live content (e.g., news, a concert, or a sports event), monitored content (e.g., video from a home security system or daycare center, or audio from a phone line), or user supplied content (e.g., video recordings from a video camera, still images, audio recordings, personal information). Content for a channel can be stored on data server 16 or in a location accessible by data server 16, such as on an interconnected storage device (not shown), or another data server. Data can also be supplied to data server 16 by a first user device 10 to be accessed by a second user device (not shown) in real time or with a delay.

The user profile is preferably configured to indicate when each channel is active, i.e., at what time(s) data server 16 is to transmit the data for that channel, and when each type of data for the channel is to be sent. Data server 16 then transmits data for each of the active channels according to these times, and may simultaneously transmit data for multiple channels (e.g., by sending packets for each of the active channels). In one embodiment, data server 16 may transmit data automatically without checking the receive status of user device 10, similar to general broadcasting. Alternatively, user device 10 sends to the server data indicating which channel is currently selected and data server 16 sends data for that channel only.

Preferably, user device 10 is configured so that the user can switch channels to access a different type of data if desired. If the connection to the server is one-way, this channel switching allows the user to access different data stored on data server 16. Data server 16 can send the data directly to user device 10 through a secure or private connection, such as a network tunnel, to multiple devices which have a current intersection in user profiles (e.g., a multicast), or to all devices on the network (e.g., channel 15 is always government or emergency information available to all devices). User device 10 can store data received for all the active channels, or only for the currently selected channel, ignoring data associated with other channels.

As indicated above, the user profile can be stored on data server 16 and modified by the user through a separate connection or directly through user device 10. The user profile can also be established when user device 10 is activated through a service provider, or according to user, manufacturer, or service provider settings. The user profile can be updated in various other ways, including by verbal request by telephone or written request by letter or fax. In some implementations, the user profile would not be established or controlled by the user, but would be established for a particular device or service. For example, user device 10 could be an audio visual (AV) system for a school which receives data on multiple channels according to a profile established through a service contract between the school administration and the service provider. In this example, different rooms of the school could each select different channels to access different data.

For example, the user profile can indicate that channel I is to include news from 9 a.m. to 5 p.m. and jazz music from 5 p.m. to 10 p.m. In this case, "news" and "jazz" are categories of data. The content for a category can be provided directly by the server (e.g., a jazz or easy listening compilation generated by the server administrator) or from a third party specified by the user (e.g., content from a service provider which provides music compilations to the server). The user can also define a category or channel's content by selecting sub-categories or specific content, such as specific songs, artists, business news from specific sources, one or more audio recordings of books ("books on tape"), etc. For example, the user can specify a series of songs or albums to be sent on a channel. The user profile could indicate that channel 2 includes a particular album to be sent each hour on the hour or upon establishing a connection between the server and the device. Data server 12 can record where the user stopped listening, such as when the connection was terminated, to begin the next transmission of the album from the same point. The user profile can indicate whether to repeat the album and for how long to continue sending the data (e.g., for a "sleep" channel to send the specified music for 30 minutes and then to stop).

The user profile can also define monitoring parameters. Monitoring parameters indicate one or more conditions when data server 16 is to provide an alert or notification to the user. Various conditions are possible, including what channel or data source to monitor, what types of events to report, when to report the event, etc. Monitoring parameters also define what type of alert to provide, such as a tone, a flashing icon, an audio, text, or video message, etc. on user device 10. An alert can be specified to be sent to the user whatever channel the user has currently selected or some channels can be "blocked" (i.e., no alerts are to be received, or only some alerts). Messages can be provided from various sources, including prerecorded by the user, synthesized by the server, and supplied by a third party. For example, in one implementation, a user can set monitoring parameters so that data server 16 will notify the user that the price of a particular stock (e.g., Company A) has reached a particular level (X) by sending an audio message (e.g., "User-Company A's stock is now at X"). Note also that the definition of a channel and monitoring parameters can overlap. For example, in one implementation, a user profile can define a channel to be data from a home security camera or system. The security camera or system can be another user device 10, as described above, so that data could be supplied to server 16 by the camera and then to another user device (e.g., carried by the user) across similar wireless connections. When that channel is selected, a user can view video and system parameters (e.g., open/close status of doors or windows) directly. The user can also designate that under certain conditions the server is to send an alert, such as when a particular (or any) window is opened. As described above, this alert can be received when the monitored channel is selected or when a different channel is selected.

The user profile would preferably be stored on data server 16 in association with an identification number or "user ID." The user ID can be unique to a particular user device 10, such as a unique number assigned to the device by the manufacturer and stored in permanent memory of the device. The user ID can also be supplied by the user to user device 10 in various ways. In one embodiment, the user can supply the user ID to user device 10 by direct entry through a keypad or other user input. In another embodiment, the user can supply the user ID to the device through a removable card, such as a PCMCIA card or a Memory Stick™, or through wireless interface 12 (e.g., when wireless interface 12 is removable). In still another embodiment, the user ID is generated or confirmed through a biometric, such as a fingerprint or voice analysis. Alternatively, data server 16 could use a combination of a user ID supplied by the user to user device 10 and information about the device, such as through a manufacturer number, to customize the data supplied to both the user and the device. For example, if user device 10 does not include a video display, data server 16 may supply only audio data and not video data to the device even though the content indicated by the user profile is a movie.

According to an operational embodiment, the user would receive data by activating user device 10, thereby establishing a connection to data server 16. If the user profile does not indicate multiple channels, the user does not need to further indicate a selection and user device 10 outputs audio or video according to data received from data server 16. If the user profile indicates multiple channels, the user can select a channel through one or a combination of inputs on user device 10. Note that user device 10 may include one or more of various inputs devices, such as a keypad, a touchscreen, a Jog Dial™, a speech recognition interface, etc. In another implementation, the user can simultaneously select multiple channels (e.g., for split-screen or picture-in-picture video).

User device 10 can include one or more types of outputs, such as audio, text, and video as discussed above. Therefore, the user profile can include an indication of available outputs for the device or data server 16 may customize its response according to known or derived information about the device. If the connection is two-way, data server 16 may query user device 10 for device capabilities.

EXAMPLE 1

The music player outputs audio by processing audio data for a user, such as playing music stored in an electronic file or transmitted in a digital stream in an encoding scheme such as MP3. As described above, the music player includes wireless interface 12 to interact with data server 16 across a wireless connection. To play music, the music player connects to data server 16 and supplies a user ID to the server. Data server 16 accesses the user profile associated with the supplied user ID. Data server 16 then accesses data indicated by the user profile and sends the data to the music player across the wireless connection. The music player receives the data from data server 16 and plays the music in the data, such as by decoding the data and outputting corresponding audio through a speaker, according to the selected channel. The music player downloads and plays the music in real-time, as an audio stream. To access different music, specified in the user profile, the user selects a different channel, such as by rotating a Jog Dial™ or entering a channel number with a keypad, Alternatively, or in addition, the music player can store blocks of data, such as an entire audio file (e.g., a song), or a portion, and play the stored data immediately or at a later time. In one implementation, the music player can include sufficient storage for downloading multiple audio files, such as an entire album. The music player can also download supplementary information, such as artist information, interviews, images, etc.

EXAMPLE 2

As described above, various types of content are available as data stored on or accessible through data server 16 (or data servers 40, 46). Access can be through various modes, including request, user profile or server settings. Data transmission can be customized to the receiving device (e.g., by device capability or according to user preference, such as audio and video for one user device but audio only for another user device). Data can be stored on the server in numerous ways, such as encoded electronic files organized by data author or owner. Examples of content include, but are not limited to, content described or illustrated herein and:

(a) Video, such as movies, broadcast television, images from closed circuit monitoring, or a feed from a camera or another video input device;

(b) Images, such as still images from a camera or selection from a video datastream, computer-generated art or graphics;

(c) Audio, such as music, recordings, dictation, news, audio derived from video or text;

(d) Telephony, such as audio input and output from a phone system (e.g., the public switched telephone network or "PSTN",a private exchange, a cellular system, or a PCS system), and data input and output from a fax machine, an answering machine or service;

(e) Storage, such as data supplied by the user (e.g., images, audio, or other data stored in files), data requested by the user (e.g., search results), and data stored on a device accessible by the server (e.g., answering machine, desktop computer, different server);

(f) Personal information, such as address information, identification, verification information (such as biometric data), government documents (such as passport images or passport data (e.g., to replace a paper passport or other document)), financial information, credit information (e.g., for authorized third party access), user settings for electronic devices (e.g., channel selections or display parameters for a television where the device is a remote control, or operation settings for an appliance such as refrigerator or oven);

(g) Games, such as video or online games (e.g., console-based, handheld-based, desktop-based, etc.) for download or access on single-use basis, time-basis, purchase-basis, etc.;

(h) Billing information, such as user name, address, account number, payment methods, billing periods, etc.

Collateral services can also be provided related to a type of accessed content. For example, call forwarding can be provided according to a user profile. Another example would be to notify a hospital when an injury is detected at a daycare center or home.

Furthermore, it will be appreciated that the server can determine what type of content to provide based on the capability of the user device through, for example, a serial number or other identifier transmitted by the user device to the server, or based on a user profile.

Figure 4:
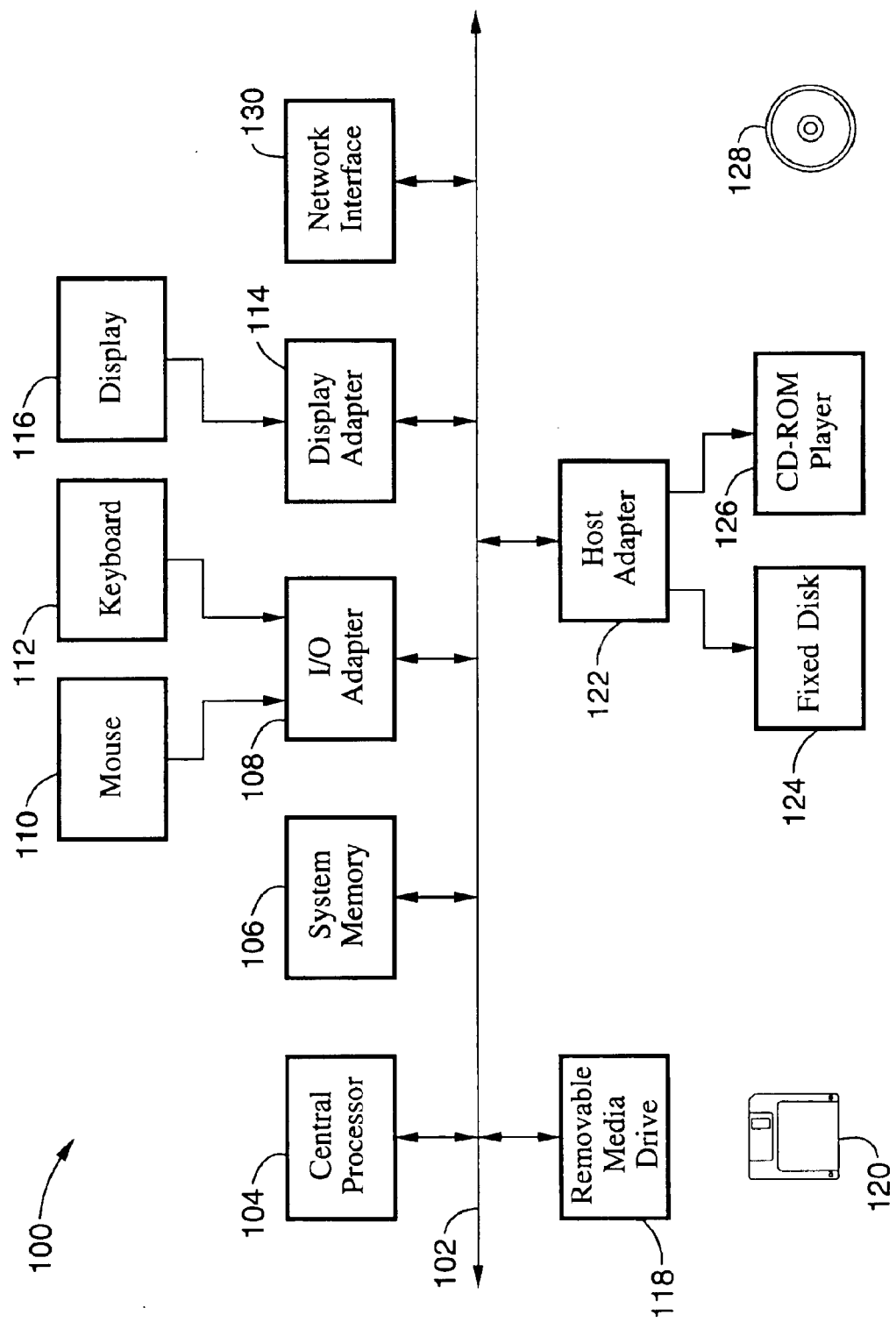
FIG. 4 is a functional block diagram showing an embodiment of a data server employed in the present invention.

Referring again to FIG. 1 as well as to FIG. 4, data server 16 is typically a computer system 100 suitable for implementing the present invention. Such a computer system 100 typically includes a bus 102 which interconnects major subsystems such as a programmable data processor 104, system memory 106 (typically RAM), an input/output (I/O) adapter 108 to which input devices such as a mouse 110 and keyboard 112 are connected, a display adapter 114 to which a thin film transistor (TFT) or cathode ray tube (CRT) display 1 16 is connected, a removable media drive 118 for receiving a floppy disk or other removable media 120, a host adapter 122 connected to a fixed disk 124, a CD-ROM drive 126 for receiving a readable or read/write CD-ROM 128, or other mass storage device, and one or more network interfaces 130 for providing a connection to a local network server through an Ethernet™ connection or the like, or to a remote server through a telephone link or though the Internet. Those skilled in the art will appreciate that other devices and subsystems could be included, and that the devices and subsystems shown may be interconnected in different ways than shown in FIG. 4. It will further be appreciated that not all of the devices shown are necessary to practice the present invention, and that the present invention may be implemented on any conventional computer system under processor control. Additionally, it will be understood that the operable software or code for implementing the data server functions of the present invention may be stored in computer readable storage media such as system memory 106, removable media 120, fixed disk 124 or CD-ROM 128.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless data storage system, comprising:
   (a) a user terminal having a wireless communications interface;
   (b) a base station configured for wireless communication with said user terminal;
   (c) a data server configured for communicating with said user terminal through said base station; and
   (d) means associated with said data server for receiving and storing data transmitted by said user terminal for subsequent retrieval;
   (e) wherein data stored by said data server includes a user profile corresponding to a user of said user terminal; and
   (f) wherein said user profile defines parameters comprising one or more types of content to be sent to said user terminal, one or more specific data sources for content to be sent to said user terminal, and the type of data and time said data is to be transmitted to said user terminal.

2. A system as recited in claim 1, wherein said user terminal comprises a programmed date processor with programming for communicating with said data server.

3. A system as recited in claim 1, wherein said user terminal is configured for sending IP packets to said base station.

4. A system as recited in claim 1, wherein said base station is configured for SDMA.

5. A system as recited in claim 1, wherein said user terminal is portable.

6. A system as recited in claim 5, wherein said base station is configured for directional transmission to said user terminal.

7. A system as recited in claim 1, wherein said user terminal comprises a music player.

8. A system as recited in claim 1, wherein said user terminal comprises a still image camera.

9. A system as recited in claim 1, wherein said user terminal comprises a video camera.

10. A system as recited in claim 1, wherein said user terminal comprises a video display device.

11. A system as recited in claim 1, wherein said user terminal comprises a car stereo.

12. A system as recited in claim 1, wherein said user terminal comprises a telephonic device.

13. A system as recited in claim 1, wherein said user terminal comprises a handheld control device.

14. A system as recited in claim 1, wherein said user terminal comprises a game device.

15. A system as recited in claim 1, wherein said user terminal comprises a home appliance.

16. A system as recited in claim 1 wherein said user terminal comprises a personal information access device.

17. A system as recited in claim 1, wherein said user terminal comprises a wireless IP receiver.

18. A wireless data retrieval system, comprising:
 (a) a user terminal having a wireless communications interface;
 (b) a base station configured for wireless communication with said user terminal;
 (c) a data server configured for communicating with said user terminal through said base station; and
 (d) means associated with said data server for transmitting data stored on said data server to said user terminal;
 (e) wherein data stored by said data server includes a user profile corresponding to a user of said user terminal; and
 (f) wherein said user profile defines parameters comprising one or more types of content to be sent to said user terminal, one or more specific data sources for content to be sent to said user terminal, and the type of data and time said data is to be transmitted to said user terminal.

19. A system as recited in claim 18, wherein said user terminal comprises a programmed data processor with programming for communicating with said date server.

20. A system as recited in claim 18, wherein said user terminal is configured for receiving IP packets from said base station.

21. A system as recited in claim 18, wherein said base station is configured for SDMA.

22. A system as recited in claim 18, wherein said user terminal is portable.

23. A system as recited in claim 22, wherein said base station is configured for directional transmission to said user terminal.

24. A system as recited in claim 18, wherein said user terminal comprises a music player.

25. A system as recited in claim 18, wherein said user terminal comprises a still image camera.

26. A system as recited in claim 18, wherein said user terminal comprises a video camera.

27. A system as recited in claim 18, wherein said user terminal comprises a video display device.

28. A system as recited in claim 18, wherein said user terminal comprises a car stereo.

29. A system as recited in claim 18, wherein said user terminal comprises a telephonic device.

30. A system as recited in claim 18, wherein said user terminal comprises a handheld control device.

31. A system as recited in claim 18, wherein said user terminal comprises a game device.

32. A system as recited in claim 18, wherein said user terminal comprises a home appliance.

33. A system as recited in claim 18, wherein said user terminal comprises a personal information access device.

34. A system as recited in claim 18, wherein said user terminal comprises a wireless IP receiver.

35. A user terminal configured for wireless communication with a data server through a base station and further configured for transmitting data to said data server for storage and subsequent retrieval;
 wherein data stored by said data server includes a user profile corresponding to a user of said user terminal; and
 wherein said user profile defines parameters comprising one or more types of content to be sent to said user terminal, one or more specific data sources for content to be sent to said user terminal, and the type of data and time said data is to be transmitted to said user terminal.

36. A user terminal as recited in claim 35, wherein said user terminal includes a wireless interface.

37. A user terminal as recited in claim 35, wherein said user terminal comprises a programmed data processor with programming for communicating with said data server.

38. A user terminal as recited in claim 35, wherein said user terminal is configured for sending IP packets to said base station.

39. A user terminal as recited in claim 35, wherein said user terminal is portable.

40. A user terminal as recited in claim 35, wherein said user terminal comprises a music player.

41. A user terminal as recited in claim 35, wherein said user terminal comprises a still image camera.

42. A user terminal as recited in claim 35, wherein said user terminal comprises a video camera.

43. A user terminal as recited in claim 35, wherein said user terminal comprises a video display device.

44. A user terminal as recited in claim 35, wherein said user terminal comprises a car stereo.

45. A user terminal as recited in claim 35, wherein said user terminal comprises a telephonic device.

46. A user terminal as recited in claim 35, wherein said user terminal comprises a handheld control device.

47. A user terminal as recited in claim 35, wherein said user terminal comprises a game device.

48. A user terminal as recited in claim 35, wherein said user terminal comprises a home appliance.

49. A user terminal as recited in claim 35, wherein said user terminal comprises a personal information access device.

50. A user terminal as recited in claim 35, wherein said user terminal comprises a wireless IP receiver.

51. A user terminal configured for wireless communication with a data server through a base station and further configured for receiving data stored on said data server;
 wherein data stored by said data server includes a user profile corresponding to a user of said user terminal; and
 wherein said user profile defines parameters comprising one or more types of content to be sent to said user terminal, one or more specific data sources for content to be sent to said user terminal, and the type of data and time said data is to be transmitted to said user terminal.

52. A user terminal as recited in claim 51, wherein said user terminal includes a wireless interface.

53. A user terminal as recited in claim 51, wherein said user terminal comprises a programmed data processor with programming for communicating with said data server.

54. A user terminal as recited in claim 51, wherein said user terminal is configured for receiving IP packets from said base station.

55. A user terminal as recited in claim 51, wherein said user terminal is portable.

56. A user terminal as recited in claim 51, wherein said user terminal comprises a music player.

57. A user terminal as recited in claim 51, wherein said user terminal comprises a still image camera.

58. A user terminal as recited in claim 51, wherein said user terminal comprises a video camera.

59. A user terminal as recited in claim 51, wherein said user terminal comprises a video display device.

60. A user terminal as recited in claim 51, wherein said user terminal comprises a car stereo.

61. A user terminal as recited in claim 51, wherein said user terminal comprises a telephonic device.

62. A user terminal as recited in claim 51, wherein said user terminal comprises a handheld control device.

63. A user terminal as recited in claim 51, wherein said user terminal comprises a game device.

64. A user terminal as recited in claim 51, wherein said user terminal comprises a home appliance.

65. A user terminal as recited in claim 51, wherein said user terminal comprises a personal information access device.

66. A user terminal as recited in claim 51, wherein said user terminal comprises an wireless IP receiver.

67. A system for transmitting data to a user, comprising:
   (a) a wireless receiver; and
   (b) a data server, said data server including a user profile defining parameters for transmitting data to said wireless receiver;
   (c) wherein said parameters comprise one or more types of content to be sent to said wireless receiver, one or more specific data sources for content to be sent to said wireless receiver, end the type of data and time said data is to be transmitted to said wireless receiver.

68. A system as recited in claim 67, further comprising a wireless base station transmitter associated with said data server.

69. A system as recited in claim 67, wherein said user profile is modifiable through a network connection to said server.

70. A system as recited in claim 67, further comprising:
   (a) a wireless transmitter associated with said wireless receiver; and
   (b) a wireless base station transmitter associated with said data server;
   (c) wherein said user profile is modifiable through a wireless connection with said wireless transmitter.

71. A system as recited in claim 67, wherein said data is carried over a plurality of user selectable data channels.

72. A system as recited in claim 67, wherein the type of data transmitted to said wireless receiver is based on the capability of said wireless receiver to receive said data.

73. A method for wireless transmission of data to a user, comprising:
   (a) storing, on a data server, a user profile defining parameters for transmitting data to a wireless receiver; and
   (b) transmitting said data according to said user profile;
   (c) wherein said parameters comprise one or more types of content to be sent to said wireless receiver, one or more specific data sources for content to be sent to said wireless receiver, and the type of data and time said data is to be transmitted to said wireless receiver.

74. A method as recited in claim 73, wherein said user profile is modifiable through a network connection to said server.

75. A method as recited in claim 73, wherein said user profile is modifiable through a wireless connection from a transmitter associated with said wireless receiver.

76. A method as recited in claim 73, wherein said data is carried over a plurality of user selectable data channels.

77. A method as recited in claim 73, wherein the type of data transmitted to said wireless receiver is based on the capability of said wireless receiver to receive said data.

* * * * *